Dec. 21, 1937.  T. W. ROLPH  2,102,975
VISIBLE SIGNAL
Filed Oct. 31, 1934
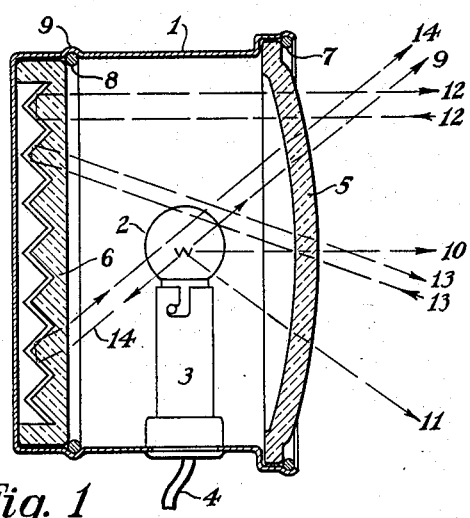
Fig. 1
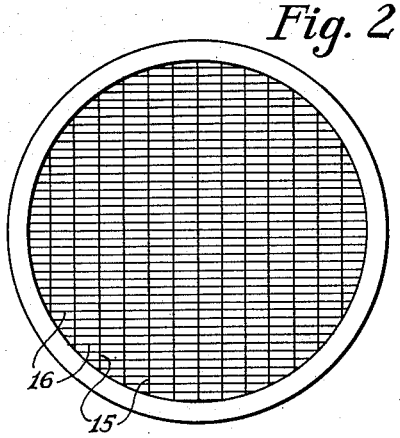
Fig. 2
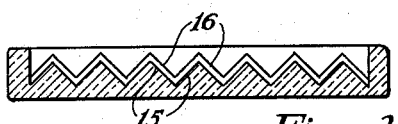
Fig. 3
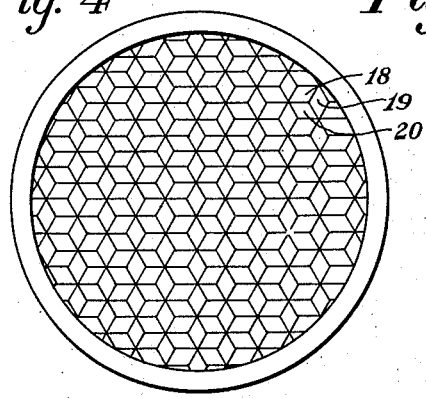
Fig. 4
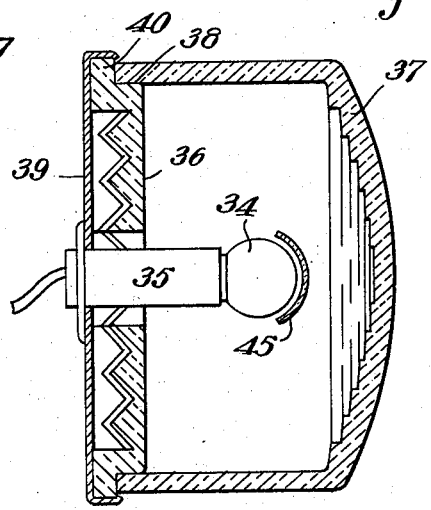
Fig. 7
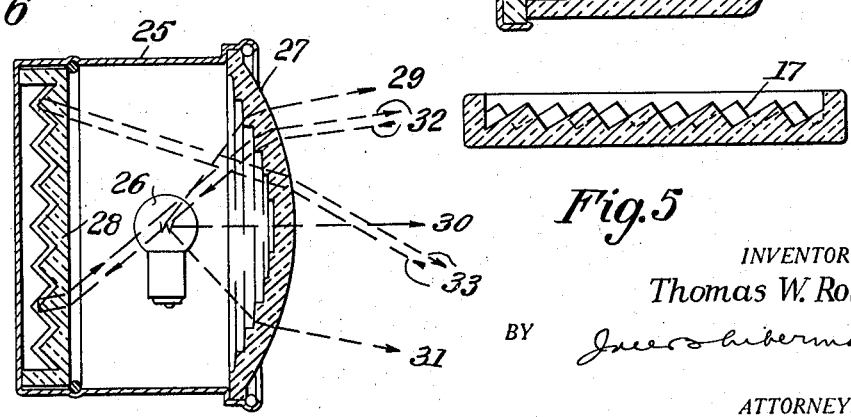
Fig. 6
Fig. 5
INVENTOR.
Thomas W. Rolph
BY
ATTORNEY.

Patented Dec. 21, 1937

2,102,975

UNITED STATES PATENT OFFICE 2,102,975

VISIBLE SIGNAL

Thomas W. Rolph, Newark, Ohio, assignor to Holophane Company, Inc., New York, N. Y., a corporation of Delaware Application October 31, 1934, Serial No. 750,909

5 Claims. (Cl. 240—8.3)

The present invention relates to visible signals.

It is customary to provide the rear end of a moving vehicle with visible signal illuminated by an enclosed artificial source, such as a lamp bulb. The functioning of this signal is dependent upon the operation of the light source. To provide a signal not dependent on the light source, it has also been customary to provide a reflector adapted to pick up the light rays from an extraneous source (such as a head light) and reflect them back in the general direction in which they came. These functions have been carried out by independent instrumentalities or by a signal lamp having a cover glass having one portion of its area designed entirely for transmission and a distinct portion of its area designed entirely for reflection.

In the past, these functions have been combined by using a lighted signal having a cover glass wherein the rear surface of part of the normally transmitted area is provided with reflecting prisms for reflecting extraneous light back in the direction of incidence. It is then assumed that this cover glass will transmit light from inside and will also reflect extraneous light back toward its source. These two functions, however, are mutually antagonistic. According to the principle of the reversibility of light rays, any light ray passing through an optical structure in a given direction will, if started through on the same path in the opposite direction, follow that same path throughout the entire structure. Consequently if a structure is so made as to reflect light back in the direction from which it comes, it cannot at the same time transmit light in the same direction. Therefore, when reflecting prisms for returning light upon its path are placed on a signal lamp cover glass, these prisms cannot transmit light without refraction at the prism surfaces which deviate the light far away from the desired path.

Reflectors which return light back to its source independent of the angle of incidence are old in the art. Such reflectors are universal direction-reversing, or sometimes known as "auto-collimating". The term "universal direction-reversing" or more simply "direction-reversing" will be used herein to describe this property of reversing the direction of incident light regardless (within limits) of the angle of incidence. A number of different types of such reflectors are per se well-known. For example, there is the central triple reflector comprising three plane surfaces placed at right angles to each other and intersecting at a point. There is the combination of two spherical surfaces of different radii but common center, placed on opposite sides of a piece of glass, the smaller one acting as a lens to receive light and the larger one being silvered to reflect the light received from the lens. These and other devices have been used for the purpose of reflecting light back in the direction of incidence.

A signal which will act effectively by reflected light from extraneous sources must accept the light throughout a substantial range of angles of incidence and reflect it back toward the source from which it came. For example, if the light of an automobile headlight shines on such a reflector, the reflector must return the beam of light back to the automobile, even though the beam strikes the signal at an angle from the normal.

The imperfections of a reflecting prismatic structure as manufactured permits some transmission of light in the desired direction. This transmission, at the slightly rounded peaks and valleys of the prisms is ordinarily small in quantity and not sufficient to serve the usual purpose of a signal lamp. Changes in structure to increase the transmission in the correct direction will inevitably decrease the reflection in that direction. In fact all attempts to combine the reflection of light from without and the transmission of light from within, in the same direction, must be based upon allowing a certain area of the surface to be used for transmission and another area of the surface for reflection. The same portion of the surface cannot act in both ways for delivering light in the desired direction. Consequently a signal cover glass combining these two functions is an inefficient device. If the functions are of equal relative importance, the cover glass cannot use more than 50% of the area for reflection and more than 50% for transmission. Since the two functions are seldom if ever desired at the same time, the device is then only 50% as effective as would be the case if the two functions were handled by separate devices.

The present invention aims to provide visible signals wherein either of two signalling functions, namely the production of a signal by light originating in an enclosed light source or the production of a signal by reflection of light originating in an extraneous light source, may be accomplished without appreciably impairing the efficiency of the device for producing either signal alone. The invention is especially directed toward the provision of a unitary structure adapted for use as a rear signal for a motor vehicle, trailer, or the like, to provide the usual tail light as well as the reflecting signal.

An object of the present invention is to overcome the inefficiency of signals having the dual purpose cover glass. This is accomplished by placing a universal direction-reversing prismatic reflector back of the light source in a signal lamp while a cover glass of the usual form is placed in front of the light source. By this arrangement of parts, the cover glass functions in the usual way for transmitting light and the universal direction-reversing reflector functions in the usual way for reflecting light back in the direction of incidence. The only interference with the action of the reflector is that the light it receives and reflects must enter through the cover glass and be returned through the cover glass. The cover glass is just as efficient as it would be if there were no reflecting function to the signal lamp. The universal direction-reversing reflector is just as efficient as it would be if there were no transmitting function to the signal lamp, with the exception of the slight loss in passing through the cover glass. However, with colored signals, this passage through the cover glass may be used to great advantage for providing color in the reflected signal. In that case, the cover glass is, for example, red in color while the direction-reversing reflector is uncolored. Since a universal direction-reversing reflector is the more expensive of the two pieces and for best results requires very accurate construction, it is preferably made of crystal glass rather than colored glass. With this combination, the cover glass transmits colored light of the proper color. The direction-reversing reflector reflects light which is colored to the proper degree by two passages through the cover glass.

The accompanying drawing shows, for purposes of illustrating the present invention, several embodiments in which the invention may take form, it being understood that the drawing is illustrative of the invention rather than limiting the same. In the drawing:

Fig. 1 shows one form of signal lamp construction;

Figs. 2 to 5, inclusive, show some of the types of universal direction-reversing reflectors which may be used in signals embodying the present invention;

Fig. 6 shows a modified form of signal lamp in which the cover glass is a lens instead of a smooth glass; and Fig. 7 shows an alternative construction wherein the cover glass is used to surround the lamp bulb completely, except for the universal direction-reversing reflector, and wherein the double transmission of reflected light through the colored cover glass and the single transmission of light from the lamp through the colored cover glass is equalized by an additional colored shield;

In Fig. 1, the signal lamp is of the type which might be used as a tail-lamp for an automobile. It comprises a casing 1, a light source or lamp 2 held in a socket 3 and fed by lead in wires 4, the casing holding at the front a cover-glass 5 and inside at the rear a universal direction-reversing reflector 6. The cover glass 5 is held in place by a retaining ring 7 while the direction-reversing reflector 6 is held in place by retaining ring 8, the latter fitting into groove 9 in the casing. This represents a typical construction, but it will be understood that the mechanical means of holding the lamp, cover-glass and direction-reversing reflector in their proper relation is susceptible of wide variation.

Light from the light source 2 emerges through the cover glass in typical directions as indicated by light rays 9, 10, and 11. Light rays incident from the outside, as for example, from the headlight of an approaching automobile, are indicated by typical light rays 12 and 13. Light ray 12 enters through the cover glass 5, is reflected by the universal direction-reversing reflector 6 and returns back in the direction from which it came. Similarly light ray 13 incident from an external source such as an approaching headlight passes through cover glass 5, is reflected by direction-reversing reflector 6 and returns back through cover glass 5 in the same path as that by which it entered, as indicated by the arrows. If any ordinary type of reflector were used back of the lamp in place of 6, light ray 13 striking this reflector at an angle would be reflected in another direction on the other side of the axis of the lamp. The use of the universal direction-reversing reflector, however, insures that light reflected from this reflector 6 returns upon its own path regardless of the angle at which it may be incident. The fact that light ray 13 passes through the bulb of the lamp has no bearing upon the function of the parts. There is a little loss in passing through the bulb, but this loss is very slight, and only a small portion of the incident light will pass through the lamp bulb.

The direction-reversing reflector also serves to act in place of an ordinary reflector for the light from the light-source going toward the back of the lamp. Thus light ray 14 emerges from the lamp in a backward direction, strikes the universal direction-reversing reflector, is returned upon its own path and goes back through the light source and out through the cover glass as indicated by the arrows. Thus the intensity of the signal from the inner lamp is increased, as indicated by light rays 9 direct from the lamp and 14 from the lamp by way of the reflector, both emerging in the same direction.

Figs. 2 to 5 inclusive indicate some of the types of universal direction-reversing reflectors which may be used in this device. Any reflector returning light in the direction of incidence may be used for this service. Fig. 2 is a back view and Fig. 3 a cross-section of a reflector of pressed prismatic glass wherein 90° prisms 15 are used and on the backs of the prisms are placed smaller 90° prisms 16 running in an opposite direction to the direction of the main prisms.

Fig. 4 is the back-view and Fig. 5 the cross-section of a universal direction-reversing reflector composed of a plurality of central triple reflectors. The reflectors are indicated at 17 in Fig. 5. Each reflector is made up of three plane surfaces 18, 19, and 20 at right angles to each other meeting at a point.

The reflectors illustrated in Figs. 2, 3, 4, and 5 act by prismatic reflection throughout a considerable angular range of incident light. Such range could be increased by silvering the reflecting surfaces but this is not necessary for most signal reflector purposes and need not be considered for ordinary uses.

Fig. 6 shows a signal lamp construction similar to Fig. 1 except that the cover glass is made in the form of a lens. This is frequently desirable in order to concentrate the light from the lamp into a beam. Sometimes the lens and reflector are placed in relation to obtain an intense beam of substantially parallel light. At other times the lens and reflector are so related that a spreading beam is obtained. The latter is usually more desirable for automobile tail-lamps. In any event, the use of a lens as a cover glass does not interfere with the operation of the signal lamp substantially as described in connection with Fig. 1. The only difference is that light entering from outside is refracted when passing through the cover glass and, after reflection from the universal direction-reversing reflector, is refracted back to its original path when passing through the cover glass again at the same point.

In Fig. 6, 25 is a casing, 26 a light source, 27 a lens cover glass and 28 a universal direction-reversing reflector. These may be held together in a construction similar to Fig. 1 or by any means desired. Typical light rays 29, 30, and 31 are emitted from the light source toward the lens cover glass and are concentrated into a beam which, in this case, spreads slightly. Light striking the structure from outside is typified by light rays 32 and 33. Light ray 32, entering from a direction toward which the internal beam is projected, is refracted by the lens to pass through the light center of the lamp. It strikes the universal direction-reversing reflector, and is reflected back upon a slightly offset path. It is acted upon by the lens and refracted in the same way as when it entered except in the opposite direction and emerges in the direction from which it came. The fact that the lens refracts the light does not affect the operation of the system because the refraction when passing through the lens in one direction is exactly compensated for by the refraction passing through the lens in the other direction at the same point. The fact that the light ray passes through the light source does not affect the operation of the structure in any way except to cause a slight absorption of light. Theoretically this ray passes through the lamp filament but actually the minute irregularities in such a system cause a very slight spreading so the filament absorbs little light.

Light ray 33 is a light ray entering the lens from a direction at one side of the axis. The refracting prisms on the lens bend this light ray. In this case it does not go through the lamp. It is reflected by the direction-reversing reflector back upon a slightly offset path, is refracted out through the lens back to the direction in which it came, as indicated by the arrows. As the reflected light from the universal direction-reversing reflector returns in the director of incidence, it is usually offset slightly from its original path. Hence, the passage through the cover glass entering and emerging is not always at exactly the same point. It is, therefore, desirable to avoid small prisms or flutes in the design of the cover glass. Configuration of ordinary sizes on the cover glass will not cause much of any difference in light direction between entering and emerging ray but configuration of a very fine character might cause divergence which would spread the reflected beam to some extent.

Fig. 7 is an illustration of refinements in structure which may be introduced without changing the general mode of operation of the device. In this figure, 34 is a lamp, 35 is a lamp socket and its holding device extending out through the center of the back of the construction, 36 is a universal direction-reversing reflector, 37 is a cover glass which may be prismatic, as shown, or smooth. An alternative method of supporting the lamp is shown. The direction-reversing reflector has a hole in the center and through this hole the electrical service is introduced. If the reflector is built up of a number of reflecting buttons as in Fig. 4, it is particularly simple to use this method of bringing in the lead-in wires and supporting the lamp. In that case the central button is omitted to make a place for the socket.

Fig. 7 shows also a cover glass construction which might be suitable in certain cases. Here the cover glass 37 is made in the form of a cup which fits over a shoulder in the direction-reversing reflector 36 as indicated at 38. Two glass pieces are sealed together at this point throughout the entire circumference. Then the only casing which is necessary is a back plate 39 to fit over the reflector flange 40 and support the wire carrying tube and socket.

In the signal lamps described in Figs. 1, 6, and 7, the cover glass would ordinarily be colored although this need not necessarily be the case. For automobile tail-lamps, the customary color is red. With the cover glass red in color, the universal direction-reversing reflector at the back would be made of crystal glass or any suitable material which will not change the color of the light. Then the light from the inner lamp produces a red signal when passing through the cover glass. The light from without produces a red signal because it enters through the cover glass and is returned through the cover glass.

It may be found, in certain cases that the hues of the transmitted light and reflected light do not match well because the transmitted light from the light source passes through the colored cover glass once while the reflected light from without passes through the colored cover glass twice. If the color of the cover glass is of sufficient density to give the right color to the light from the light-source, it may color the entering and reflected light too much or it may absorb too much of this light in certain cases. In such cases this objection can be overcome by using a secondary colored screen 45 in front of the light source, as illustrated in Fig. 7.

In this variation of the device, the cover glass will be made of a color such as to give the correct color to a reflecting signal considering the fact that the light passes through this cover glass twice. If this cover glass transmits light direct from the light source without any other change, this light may be of too light a hue. To overcome this, the screen 45 is made to intercept the light direct from the light source to the cover glass. This screen 45 is made to produce the same degree of coloring as cover glass. Thus, the transmitted light from the light source passes once through 45 and 37 and the coloring effect is the same as for the reflected light which passes through the cover glass twice. Any light entering from outside and passing through the screen 45 will, of course, be colored to a deeper extent than is desired. However, the screen 45 can be made small, so that very little of the light entering from outside will strike it.

This introduction of a supplementary coloring screen such as 45 may also be used to produce different colors for the transmitted light and the reflected light in case they should be desired. Other changes in the colors of the various parts may be used to produce combinations of different colors. The device is not limited to the production of colored signals or to the use of a single color.

It is obvious that the invention may be embodied in other forms and constructions, and I wish it to be understood that the particular forms shown are but illustrative. Various modifications and changes being possible, I do not otherwise limit myself in any way with respect thereto, except as defined in the claims.

What is claimed is:

1. A device adapted to produce a visible signal from either a self-contained light source or from the substantially parallel light rays from a remote extraneous light source, comprising a light-transmitting cover, a transparent universal direction-reversing reflector having a multiplicity of small prisms disposed in its rear face, the reflector being disposed behind the cover to receive substantially all the extraneous light transmitted through the cover and return it toward the cover for retransmission thereby in a beam directed toward the extraneous source, and a light source between the cover and reflector, the same areas of the surfaces of the cover being effective for simultaneously transmitting light originating in both sources, the cover member being in the form of a light concentrating lens whose focal point coincides with the enclosed light source, the lens prisms diverting the incident and reflected rays from the extraneous source equally so that the emitted reflected ray is parallel with the incident ray, the small prisms being sufficiently large for transmitting the reflected beam without substantial scattering.

2. A device as claimed in claim 1, wherein the cover member is cup-shaped and surrounds the enclosed source on all sides except that toward the reflector.

3. A device as claimed in claim 1, wherein the reflector is apertured and a lamp socket carried in the aperture supports the bulb.

4. A device as claimed in claim 1, having a small colored screen between the enclosed source and cover to modify the color of the beam produced by the enclosed source without intercepting a substantial portion of the rays originating in the extraneous source.

5. A device as claimed in claim 1, wherein the color density of the cover is of a value to give a desired color to the reflected emitted beam, said color density of the cover being insufficient to color the beam from the enclosed source to the desired depth, and having a supplemental color screen through which the light from the enclosed source passes before falling on the cover.

THOMAS W. ROLPH.